United States Patent
Bao et al.

(10) Patent No.: US 12,339,497 B2
(45) Date of Patent: Jun. 24, 2025

(54) METHOD FOR OPTICAL FIBER FUSION SPLICING

(71) Applicant: Menovex Medical Technology (Shenzhen) Co., Ltd, Guangdong (CN)

(72) Inventors: Wenqiang Bao, Guangdong (CN); Encai Ji, Guangdong (CN); Yixiang Dai, Guangdong (CN); Ke Zeng, Guangdong (CN); Liuzhu Li, Guangdong (CN)

(73) Assignee: Menovex Medical Technology (Shenzhen) Co., Ltd, Shenzhen (CN)

( * ) Notice: Subject to any disclaimer, the term of this patent is extended or adjusted under 35 U.S.C. 154(b) by 0 days.

(21) Appl. No.: 19/017,713

(22) Filed: Jan. 12, 2025

(65) Prior Publication Data

US 2025/0147237 A1    May 8, 2025

Related U.S. Application Data

(63) Continuation of application No. PCT/CN2024/105953, filed on Jul. 17, 2024.

(30) Foreign Application Priority Data

Jul. 19, 2023    (CN) .......................... 202310891492.7

(51) Int. Cl.
G02B 6/25    (2006.01)
G02B 6/255    (2006.01)

(52) U.S. Cl.
CPC ............. *G02B 6/2551* (2013.01); *G02B 6/25* (2013.01)

(58) Field of Classification Search
CPC .................................. G02B 6/25; G02B 6/2551
See application file for complete search history.

(56) References Cited

U.S. PATENT DOCUMENTS 4,958,905 A  *  9/1990  Tynes ................... G02B 6/2551
385/96

FOREIGN PATENT DOCUMENTS

| CN | 1349113 A | 5/2002 |
| CN | 106405743 A | 2/2017 |

(Continued)

OTHER PUBLICATIONS

PCT/CN2024/105953 Written Opinion of the ISA, Oct. 31, 2024; English translation, pp. 1-5.

(Continued)

*Primary Examiner* — Ryan A Lepisto
(74) *Attorney, Agent, or Firm* — Addison D. Ault; IPGentleman Intellectual Property Services, LLC

(57) ABSTRACT

The present disclosure provides an optical fiber fusion splicing method, comprising: performing a slit operation on the coating layer at a preset stripping length of the optical fiber to be fused; immersing the optical fiber in a softening liquid to soften the coating layer after the slit is formed; taking out the optical fiber and applying a force in an axial direction of the optical fiber to strip the softened coating layer; cutting an end of the optical fiber after the coating layer is stripped, to obtain a fusion end face; fusing two fusion end faces; sleeving a fusion point with a light-transmitting tube, filling the light-transmitting tube with coating glue and then performing a vacuum treatment, and irradiating the light-transmitting tube with an ultraviolet lamp to solidify the coating glue in the light-transmitting tube.

11 Claims, 9 Drawing Sheets

(56) References Cited

FOREIGN PATENT DOCUMENTS

| | | | |
|---|---|---|---|
| CN | 108919423 | A | 11/2018 |
| CN | 111352189 | A | 6/2020 |
| CN | 111399139 | A | 7/2020 |
| CN | 116880013 | A | 10/2023 |
| GB | 2175410 | A | 11/1986 |
| WO | WO97/39371 | | 10/1997 |

OTHER PUBLICATIONS

PCT/CN2024/105953 Written Opinion of the ISA, Oct. 31, 2024; Original Chinese, pp. 1-5.
PCT/CN2024/105953 International Search Report, Oct. 31, 2024; English translation, pp. 1-3.
PCT/CN2024/105953 International Search Report, Oct. 31, 2024; Original Chinese, pp. 1-3.
CN116880013A, published Oct. 13, 2023; English machine translation generated Jan. 7, 2025 pp. 1-.
CN111399139A, published Jul. 10, 2020; English machine translation generated Jan. 7, 2025 pp. 1-7.
CN111352189A, published Jun. 30, 2020; English machine translation generated Jan. 7, 2025 pp. 1-5.
CN108919423A, published Nov. 13, 2018; English machine translation generated Jan. 7, 2025 pp. 1-10.
CN10605743A, published Feb. 15, 2017; English machine translation generated Jan. 7, 2025 pp. 1-10.
CN1349113A, published May 15, 2002; English machine translation generated Jan. 7, 2025 pp. 1-16.

\* cited by examiner

METHOD FOR OPTICAL FIBER FUSION SPLICING

CROSS-REFERENCE TO RELATED APPLICATION

This application claims priority to Chinese Patent Application No. 202310891492.7, filed on Jul. 19, 2023, titled "Method for optical fiber fusion splicing" before the China National Intellectual Property Administration, the disclosure of which is incorporated herein by reference in entirety.

TECHNICAL FIELD

The present disclosure relates to the field of optical fiber fusion splicing technology, and in particular to an optical fiber fusion splicing method.

BACKGROUND

An optical fiber laser is generally composed of a plurality of passive optical devices and a pump source(s), and various devices are connected by optical fiber fusion splicing, and the optical fiber fusion splicing point becomes the weakest part of the fusion system. The processing quality of the fusion splicing point determines the stability of the system. The fusion splicing process is generally divided into five steps: optical fiber stripping, optical fiber cleaning, optical fiber cutting, optical fiber fusion splicing and optical fiber coating. In the prior art, the optical fiber stripping generally uses Miller pliers, or hot stripping pliers, or blades, or other optical fiber stripping equipment to strip the optical fiber coating by physical contact, and alternatively laser stripping may also be used.

In the prior art, the optical fiber stripping still has the following disadvantages: if the optical fiber stripping adopts the physical contact stripping method, for example, it adopts blades, and the blades are very likely to scratch the optical fiber cladding during the stripping process, resulting in fine cracks and other defects. The optical fiber is easy to break, the cladding light will overflow, and the heat accumulation will burn the fusion splicing point; if the optical fiber stripping adopts the laser stripping method, it is complicated to operate, and the laser stripping method belongs to thermal stripping, which is very likely to damage the optical fiber cladding.

SUMMARY

This application provides an optical fiber fusion splicing method to solve the technical problem that the optical fiber cladding is easily damaged when the physical contact stripping method or laser stripping method is used for optical fiber stripping in the prior art.

There is provided in the application a method for optical fiber fusion splicing, wherein an optical fiber to be fused comprises a fiber core, a cladding layer and a coating layer in order from the inside to the outside in a radial direction, and the method comprises the following steps:

coating layer stripping: cutting the coating layer at a preset stripping length of the optical fiber to be fused, to form a slit; immersing the optical fiber to be fused in a softening liquid to soften the coating layer after the slit is formed, wherein the slit is flush with the highest level of the softening liquid; after immersing for a predetermined time, taking out the optical fiber to be fused and applying an acting force in an axial direction of the optical fiber to be fused, to strip the softened coating layer to expose the cladding layer;

fiber cutting: cutting an end of the optical fiber to be fused after stripping the coating layer to obtain a fusion end face;

fiber fusion: fusing two fusion end faces obtained in sequence through the coating layer stripping and fiber cutting steps; and fusion point coating: sleeving a fusion point with a light-transmitting tube, filling the light-transmitting tube with coating glue and then implementing a vacuum process to the light-transmitting tube, and irradiating the light-transmitting tube with an ultraviolet lamp to solidify the coating glue in the light-transmitting tube.

In the optical fiber fusion splicing method provided in the present application, when stripping the coating layer, an axial force is applied to the optical fiber after physical slitting and chemical immersion softening, to strip the coating layer and expose the cladding layer. Compared with the physical contact stripping in the prior art, the coating layer is softened after immersion and disconnected at the slit position, and there is no damage to the cladding layer caused by friction of hard debris, and the optical fiber stripping end is flat and smooth; when coating the fusion point, on the one hand, a light-transmitting tube is used to sleeve/cover the fusion part, and the light-transmitting tube can provide a certain mechanical strength support for the fusion part, avoid bending of the fusion part, and protect the fusion part; on the other hand, the coating glue is poured into the light-transmitting tube and then the tube is vacuumed, the coating effect is good, the coating glue is transparent and has no defects, and the temperature rise is low during the working process.

According to some embodiments of the present disclosure, after the coating layer stripping step, the method further comprises:

fiber cleaning: cleaning and drying the optical fiber to be fused after stripping the coating layer.

According to some embodiments of the present disclosure, the fiber cleaning comprises cleaning with dust-free paper dipped in anhydrous alcohol; or cleaning with dust-free cotton dipped in anhydrous alcohol; or ultrasonic cleaning with anhydrous ethanol as a solvent.

According to some embodiments of the present disclosure, in the step of "cutting the coating layer at a preset stripping length of the optical fiber to be fused, to form a slit", the slit is a circular ring slit or an arc slit.

According to some embodiments of the present disclosure, in the step of "cutting the coating layer at a preset stripping length of the optical fiber to be fused, to form a slit", the number of the slits is at least 2, and the slits are arranged at intervals at the same cut surface side of the optical fiber to be fused.

According to some embodiments of the present disclosure, in the step of "cutting the coating layer at a preset stripping length of the optical fiber to be fused, to form a slit", the diameter of the cladding layer is $D_1$, the diameter of the coating layer is $D_2$, and the depth t of the slit is between $(0, (D_2-D_1)/2)$. The depth of the slit is limited in this way to prevent the optical fiber stripping tool from contacting the cladding layer of the optical fiber to be fused and damaging the cladding layer.

According to some embodiments of the present disclosure, in the step of "immersing the optical fiber to be fused in a softening liquid to soften the coating layer after the slit is formed", the softening liquid is anhydrous ethanol, the concentration of the anhydrous ethanol is greater than or equal to 99.5%, and the immersion time is greater than or equal to 6 hours. In this way, compared with acetone and toluene, anhydrous ethanol is almost non-toxic, more environmentally friendly and safe, and the immersion softening of the anhydrous ethanol to the coating layer is gentler, and it has no corrosive effect on the optical fiber cladding layer, so that the coating layer remains a complete cylinder during the stripping process, and the coating layer is disconnected at the slit position, and the complete coating layer is of a tubular structure after being pulled out, and there is no damage caused by friction of hard debris on the cladding layer; in addition, compared with strong acid, it avoids the undesirable phenomenon that strong acid corrosion may cause local hairiness of the optical fiber cladding layer.

According to some embodiments of the present disclosure, the softening liquid is contained in a container with a cover plate, the cover plate of the container is provided with an opening, and the end of the optical fiber to be fused that has been slit passes through the opening and is immersed in the softening liquid. In the optical fiber fusion splicing method provided by the present application, the coating layer is immersed and softened, and a cover plate is set on the container, and the cover plate makes the container sealed to prevent the softening liquid from volatilizing.

According to some embodiments of the present disclosure, the fiber cutting step comprises: using a first clamp to clamp the end of the optical fiber to be fused from which the coating layer has been stripped; using a second clamp to clamp a portion of the optical fiber to be fused with the coating layer; cutting the optical fiber to be fused, from which the coating layer has been stripped, between the first clamp and the second clamp, to form a crack; using the first clamp and the second clamp respectively to apply axial tension in opposite directions to the optical fiber to be fused, so that the optical fiber to be fused is disconnected. In this way, there is no contact contamination in the cladding retention part, which prevents the cladding retention part from being damaged.

According to some embodiments of the present disclosure, the fiber fusion step comprises: fixing two optical fibers to be fused on positioning structures of a fusion splicing device, aligning the fusion end faces of the two optical fibers to be fused, and then performing discharge fusion splicing, wherein the positioning structures of the fusion splicing device act on the parts of the two optical fibers to be fused that have the coating layer. Such placement avoids direct contact between the positioning structure and the cladding layer of the optical fiber to be fused, and prevents impurities such as particles and debris on the positioning structure from damaging the cladding layer of the optical fiber when the optical fiber to be fused is aligned or even rotated.

According to some embodiments of the present disclosure, the positioning structure comprises a V-shaped groove and a pressure foot, and the fiber fusion step comprises: placing the coating layer parts of the two optical fibers to be fused in the V-shaped grooves, allowing the pressure foots to face the V-shaped grooves and abutting against the coating layer parts of the optical fibers to be fused, and performing discharge fusion splicing on the end faces of the cut optical fibers to be fused.

According to some embodiments of the present disclosure, the step of "sleeving a fusion point with a light-transmitting tube, filling the light-transmitting tube with coating glue and then implementing a vacuum process to the light-transmitting tube" comprises: using the coating glue to seal between a first end of the light-transmitting tube and the coating layer; placing the light-transmitting tube vertically, and filling the light-transmitting tube with the coating glue from a second end of the light-transmitting tube; placing the optical fiber to be fused sleeved with the light-transmitting tube in a vacuum box and evacuating for 10 min to 60 min.

In the optical fiber fusion splicing method provided in the present application, when performing optical fiber coating, on the one hand, a light-transmitting tube is used to sleeve/cover the fusion part, and the light-transmitting tube can provide a certain mechanical strength support for the fusion part, avoid bending of the fusion part, and protect the fusion part; on the other hand, the coating glue is poured into the light-transmitting tube and then the tube is vacuumed, the coating effect is good, the coating glue is transparent and has no defects, and the temperature rise is low during the working process.

According to some embodiments of the present disclosure, in the step of fusion point coating, the light-transmitting tube is configured as a glass capillary.

According to some embodiments of the present disclosure, in the step of fusion point coating, a low-refractive-index ultraviolet glue with a refractive index lower than 1.40 is used as the coating glue.

According to some embodiments of the present disclosure, in the step of fusion point coating, the power of the ultraviolet lamp is less than or equal to 1 W and the irradiation time of the ultraviolet lamp is configured to be 30 s~300 s.

According to some embodiments of the present disclosure, the predetermined time is between 6 h-10 h. The predetermined time is limited in this way to ensure that the coating layer is fully softened, it is convenient for the subsequent stripping of the coating layer and it prevents damage to the cladding layer.

DESCRIPTION OF REFERENCE NUMERALS

1-1, first pump source; 1-2, first pump combiner; 1-3, high reflection grating; 1-4, first gain fiber; 1-5, low reflection grating; 1-6, first fusion point; 1-7, second fusion point;

2-1, second pump source; 2-2, second pump combiner; 2-3, third fusion point; 2-4, second gain fiber;

10, optical fiber to be fused; 11, fiber core; 12, cladding layer; 13, coating layer; 14, slit; 15, arc slit; 16, circular ring slit; 21, first clamp; 22, second clamp; 23, optical fiber cutter; 31, V-shaped groove; 32, pressure foot; 41, light-transmitting tube; 42, coating glue.

DETAILED DESCRIPTION OF EMBODIMENTS

In order to make the above-mentioned purposes, features and advantages of the present application more obvious and easy to understand, the application background and specific embodiments of the present application are described in detail below in conjunction with FIGS. 1-9.

Figure 1:
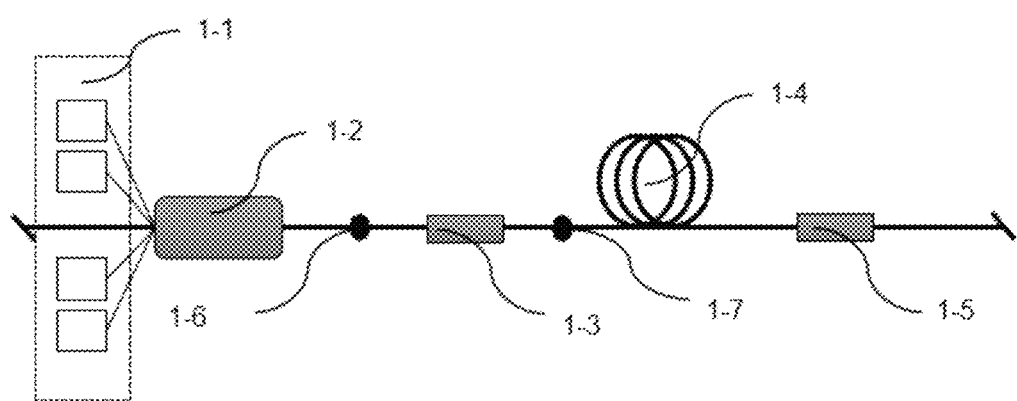
FIG. 1 is a schematic structural view of a seed source of a fiber laser in the prior art.

FIG. 1 shows a seed source structure of an existing general fiber laser, including a first pump source 1-1, a first pump combiner 1-2, a high reflection grating 1-3, a first gain fiber 1-4 and a low reflection grating 1-5, wherein the first fusion point (fusion joint) 1-6 of the first pump combiner 1-2 and the high reflection grating 1-3, and the second fusion point 1-7 of the high reflection grating 1-3 and the first gain fiber 1-4 constitute the key fusion points of this seed source structure, which are the weakest parts.

Figure 2:
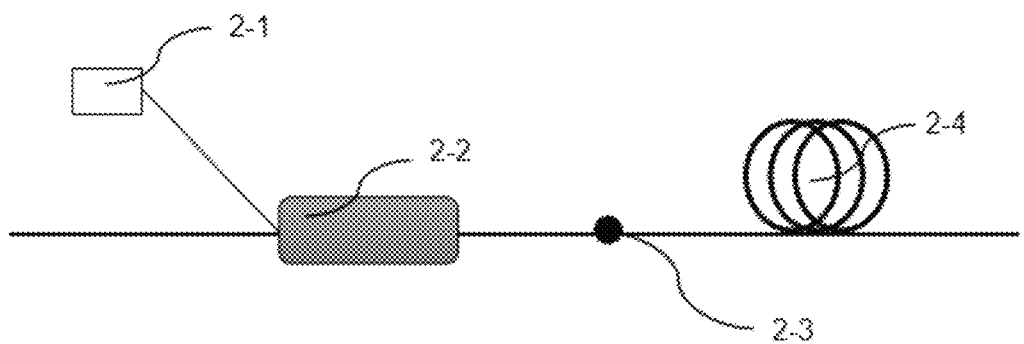
FIG. 2 is a schematic structural view of an amplifier of a fiber laser in the prior art.

FIG. 2 is an amplifier structure of an existing general fiber laser, including a second pump source 2-1, a second pump combiner 2-2 and a second gain fiber 2-4, the third fusion point 2-3 of the second pump combiner 2-2 and the second gain fiber 2-4 is the key fusion point of this amplifier, which is also the weakest part.

The optical fiber fusion splicing method provided in the embodiment of the present application is suitable for fusion of the key fusion points in the above-mentioned FIGS. 1 and 2.

On the other hand, the existing high-power fiber lasers generally use cladding pumping, where the pump combiner introduces the pump light into the passive fiber cladding, it is then fused with the gain fiber and introduced into the gain fiber cladding. Under the action of high-power pumping, the pump light will fill the cladding. If the cladding is damaged, dirty, or otherwise defective, the cladding light will be extracted out (guided out) or absorbed and concentrated, causing heat. Once the threshold is exceeded, a burning accident will occur.

Figure 3:
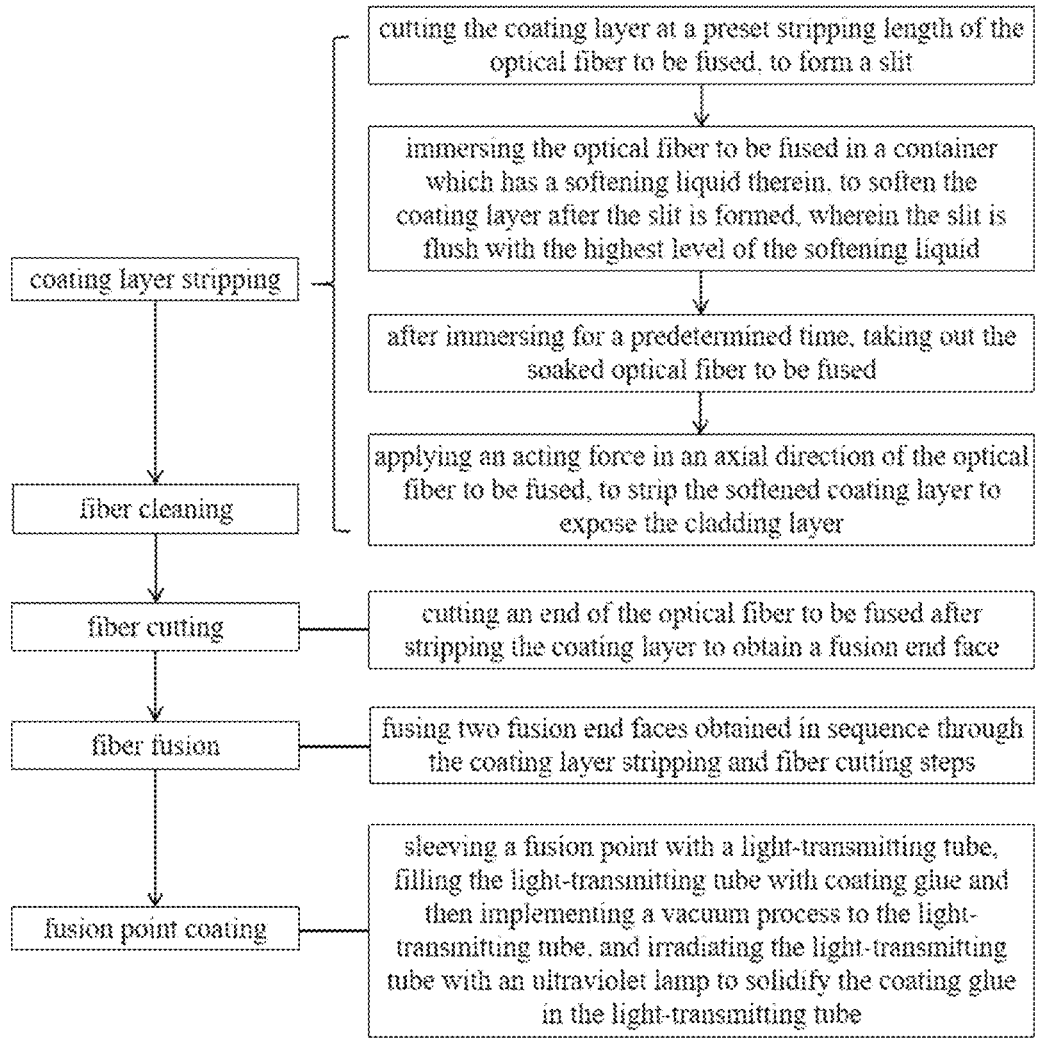
FIG. 3 is a schematic view showing the process of the optical fiber fusion splicing method provided in the embodiment of the present application.
Figure 4:
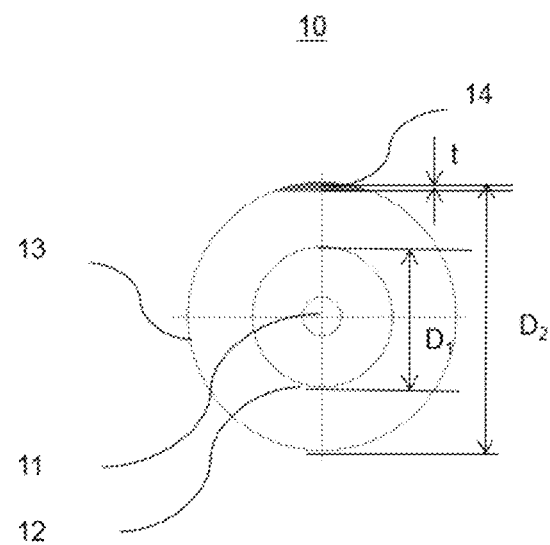
FIG. 4 is a first schematic view of the fiber slit cross-section in the optical fiber fusion splicing method provided in the embodiment of the present application.

Referring to FIGS. 3 and 4, the embodiment of the present application provides an optical fiber fusion splicing method, wherein the optical fiber 10 to be fused includes a fiber core 11, a cladding layer 12, and a coating layer 13 in order radially from the inside to the outside, and the method includes the following steps: coating layer stripping: cutting the coating layer at a preset stripping length of the optical fiber 10 to be fused, to form a slit 14; immersing the optical fiber 10 to be fused in a softening liquid to soften the coating layer 13 after the slit 14 is formed, wherein the slit 14 is flush with the highest level of the softening liquid; after immersing for a predetermined time, taking out the optical fiber 10 to be fused is taken out and applying an acting force in an axial direction of the optical fiber 10 to be fused, to strip the softened coating layer 13 to expose the cladding layer 12; fiber cutting: cutting an end of the optical fiber 10 to be fused after stripping the coating layer 13 to obtain a fusion end face; fiber fusion: fusing the two fusion end faces obtained by the coating layer stripping and fiber cutting steps in sequence; and fusion point coating: sleeving a fusion point with a light-transmitting tube 41, filling the light-transmitting tube 41 with coating glue and then evacuating it (implementing a vacuum process to the light-transmitting tube), and irradiating the light-transmitting tube 41 with an ultraviolet lamp to solidify the coating glue in the light-transmitting tube 41.

It should be noted that the optical fiber stripping tool is used to cut the optical fiber to be fused at the preset stripping length of the optical fiber 10 to be fused, to form the slit 14. During the process of forming the slit 14, the optical fiber stripping tool does not contact the cladding layer 12 of the optical fiber 10 to be fused to prevent damage to the cladding layer 12. The optical fiber stripping tool can be a blade or a Miller clamp. If a Miller clamp is used to cut to form the slit 14, the limit screw can be adjusted to control the aperture diameter of the Miller clamp to be slightly smaller than the diameter of the coating layer 13, so as to ensure that the Miller clamp will not get stuck in the cladding layer 12 of the optical fiber.

It should be noted that the preset stripping length is between 3 cm and 4 cm.

It should be noted that the predetermined time is between 6 h and 10 h, and preferably, the predetermined time is 8 h. The predetermined time is limited in this way to ensure that the coating layer 13 is fully softened, which is convenient for the subsequent stripping of the coating layer 13 and prevents damage to the cladding layer 12.

It should be noted that the slit 14 is flush with the highest level of the softening liquid, ensuring that the coating layer 13 of the preset stripping length is completely immersed in the softening liquid, which is convenient for the subsequent complete stripping; it prevents the coating layer 13 outside the preset stripping length from being softened.

It should be noted that, the soaked optical fiber 10 to be fused is taken out, the soaked coating layer is clamped with dust-free paper, and a force is applied to the coating layer along the axial direction of the optical fiber 10 to be fused, and the soaked coating layer 13 is stripped to expose the cladding layer 12.

Therefore, the optical fiber fusion splicing method provided in the embodiment of the present application adopts physical cutting to form a slit 14 and adopts chemical soaking/immersion to soften the coating layer, and then applies axial force to the optical fiber to strip the coating layer 13 to expose the cladding layer 12. Compared with the physical contact stripping in the prior art, the soaked coating layer 13 of the present application is softened and disconnected at the position of the slit 14, there is no damage to the cladding layer 12 caused by friction of hard debris, and the stripping end of the optical fiber is flat and smooth; when coating the fusion point, on the one hand, a light-transmitting tube is used to sleeve/cover the fusion part, and the light-transmitting tube can provide a certain mechanical strength support for the fusion part, avoid bending of the fusion part, and protect the fusion part; on the other hand, the coating glue is poured into the light-transmitting tube and then the tube is vacuumed, the coating effect is good, the coating glue is transparent and has no defects, and the temperature rise is low during the working process.

In the embodiment of the present application, after the coating layer stripping step, it also includes: fiber cleaning: cleaning and drying the optical fiber 10 to be fused after the coating layer 13 is stripped. This arrangement prevents the cleaning liquid from remaining.

It should be noted that in a specific embodiment, the fiber cleaning method may be to use dust-free paper or dust-free cotton dipped in anhydrous alcohol for cleaning. This method is convenient and economical, but if the cleaning force is too strong, it is easy to cause debris to scratch the cladding layer 12 of the optical fiber 10 to be fused, causing cracks in the cladding layer 12, affecting the service life of the optical fiber. Therefore, dust-free paper or dust-free cotton dipped in anhydrous alcohol for cleaning needs to be used in a one-direction gentle-wipe way, avoiding repeated use of a single piece of dust-free paper or a single piece of dust-free cotton, and preventing friction damage to the cladding layer 12.

In another specific embodiment, the fiber cleaning method may also be ultrasonic cleaning, and the ultrasonic cleaning solvent uses anhydrous ethanol, the cleaning power is 2 w~5 w, and the cleaning time is between 20 s~40 s. By limiting the cleaning power and cleaning time to meet a certain range, the ultrasonic cleaning is ensured to be thorough, and stubborn stains are prevented from remaining on the optical fiber 10 to be fused.

Preferably, the cleaning power of ultrasonic cleaning is 3 w, and the cleaning time is 30 s.

It should be noted that the drying method can be air-dried. Specifically, pure compressed nitrogen is used to blow and dry the optical fiber 10 to be fused after stripping the coating layer 13.

Figure 5:
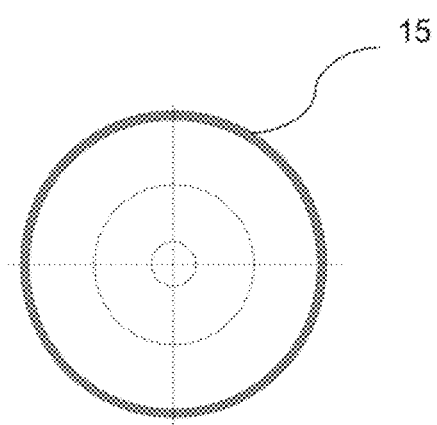
FIG. 5 is a second schematic view of the fiber slit cross-section in the optical fiber fusion splicing method provided in the embodiment of the present application.
Figure 6:
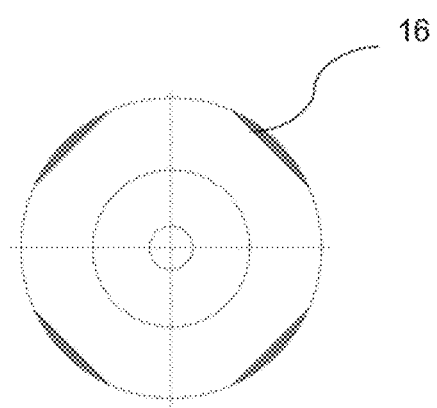
FIG. 6 is a third schematic view of the fiber slit cross-section in the optical fiber fusion splicing method provided in the embodiment of the present application.

Referring to FIGS. 4 to 6, in the embodiment of the present application, in the step of cutting the coating layer at the preset stripping length of the optical fiber 10 to be fused to form the slit 14, the slit 14 is a circular ring slit 16 or an arc slit 15. It should be noted that an optical fiber stripping tool is used to cut and form one circular ring slit 16 or one arc slit 15 or two arc slits 15 or three arc slits 15 or four arc slits 15 or other multiple arc slits 15 along the same cut surface of the coating layer 13.

In the embodiment of the present application, in the step of cutting the coating layer at the preset stripping length of the optical fiber 10 to be fused to form the slit 14, the number of the slits 14 is at least 2, and the slits 14 are arranged at intervals on the same cut surface side of the optical fiber 10 to be fused.

In the embodiment of the present application, the slits 14 are arranged at equal intervals on the same cut surface side of the optical fiber 10 to be fused.

Referring to FIG. 4, in the embodiment of the present application, the diameter of the cladding layer 12 is $D_1$, the diameter of the coating layer 13 is $D_2$, and the depth t of the slit 14 is between (0, $(D_2-D_1)/2$). In this way, the depth of the slit 14 is limited, so as to prevent the optical fiber stripping tool from contacting the cladding layer 12 of the optical fiber 10 to be fused and causing damage to the cladding layer 12.

It should be noted that the material of the coating layer 13 is rubber, and the softening liquid can be ethanol, acetone or toluene. In the embodiment of the present application, in the step of immersing the optical fiber 10 to be fused in the softening liquid to soften the coating layer 13 after the slit 14 is formed, preferably, the softening liquid is anhydrous ethanol, the concentration of the anhydrous ethanol is greater than or equal to 99.5%, and the immersion time is greater than or equal to 6 hours. In this way, compared with acetone and toluene, anhydrous ethanol is almost non-toxic, more environmentally friendly and safe, and the immersion softening of the anhydrous ethanol to the coating layer 13 is gentler, and it has no corrosive effect on the cladding layer 12 of the optical fiber, so that the coating layer 13 is still a complete cylinder during the stripping process, and the coating layer is disconnected at the slit position. After being pulled out, the complete coating layer 13 is of a tubular structure, and there is no phenomenon of debris rubbing against the cladding layer 12 to cause damage; in addition, compared with strong acid, it avoids the undesirable phenomenon of local hairiness of the cladding layer 12 of the optical fiber caused by strong acid corrosion.

In an embodiment of the present application, the softening liquid is contained in a container with a cover plate, and an opening is provided on the cover plate of the container, and one end of the optical fiber 10 to be fused that has been slit passes through the opening and is immersed in the softening liquid.

It should be noted that the container can be a glass beaker or a plastic bottle.

In the optical fiber fusion splicing method provided in the embodiment of the present application, the coating layer 13 is immersed and softened, and a cover plate is provided on the container, and the cover plate seals the container to prevent the softening liquid from volatilizing.

In an embodiment of the present application, a clamp can be provided on the cover plate, and the clamp is colinear with the axis of the opening, and the clamp is configured to clamp the optical fiber 10 to be fused. Such a configuration facilitates clamping the optical fiber 10 to be fused, and adjusting the depth of the optical fiber 10 to be fused into the softening liquid.

In another embodiment of the present application, the optical fiber 10 to be fused is bonded to the cover plate by tape.

Figure 7:
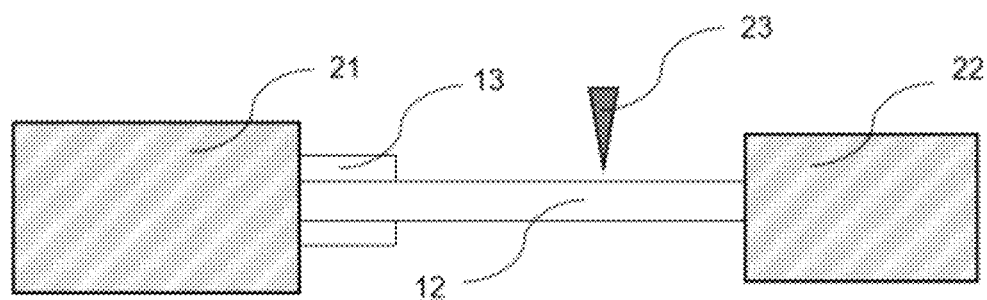
FIG. 7 is a schematic structural view showing fiber cutting in the optical fiber fusion splicing method provided in the embodiment of the present application.

Referring to FIG. 7, in the embodiment of the present application, the fiber cutting step includes: using a first clamp 21 to clamp one end of the optical fiber 10 to be fused from which the coating layer 13 has been stripped; using a second clamp 22 to clamp the part of the optical fiber 10 to be fused with the coating layer 13; cutting the optical fiber 10 to be fused, from which the coating layer 13 has been stripped, between the first clamp 21 and the second clamp 22, to form a crack; using the first clamp 21 and the second clamp 22 respectively to apply axial tension in opposite directions to the optical fiber 10 to be fused, so that the optical fiber 10 to be fused is disconnected. The cladding layer 12 close to the coating layer 13 is the reserved part of the cladding layer 12. In this cutting way, there is no contact contamination in the reserved part of the cladding layer 12, which prevents the reserved part of the cladding layer 12 from being damaged.

Specifically, the cutter 23 for optical fiber is used to cut the cladding layer 12 of the optical fiber 10 to be fused.

Figure 8:
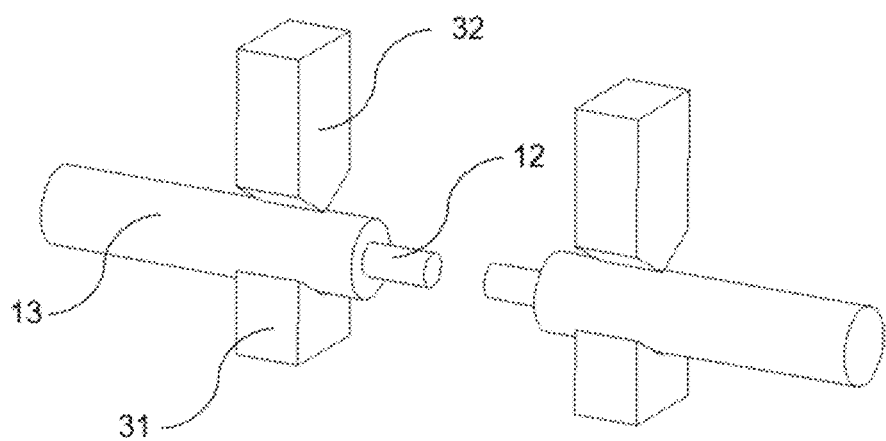
FIG. 8 is a schematic view showing fiber fusion in the optical fiber fusion splicing method provided in the embodiment of the present application.
Figure 9:
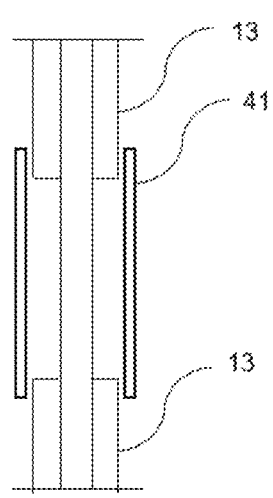
FIGS. 9 (a) to 9 (c) are schematic views showing the state of fiber coating in the optical fiber fusion splicing method provided in the embodiment of the present application.
Figure 9:
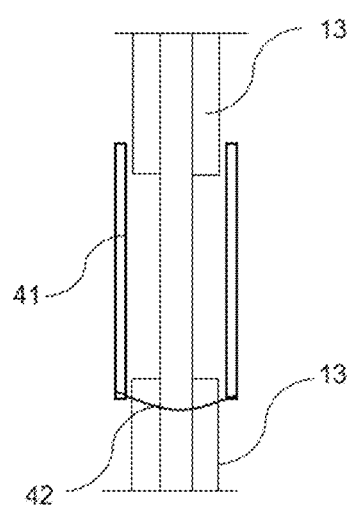
Figure 9:
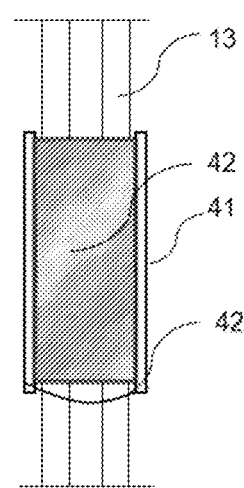

Referring to FIG. 8, in the embodiment of the present application, the fiber fusion step includes: fixing two optical fibers 10 to be fused on the positioning structures of the fusion splicing device, aligning the fusion end faces of the two optical fibers 10 to be fused, and then performing discharge fusion splicing, wherein the positioning structures of the fusion splicing device act on the parts of the two optical fibers 10 to be fused that have the coating layer 13. Such placement avoids direct contact between the positioning structure and the cladding of the optical fibers to be fused, and prevents impurities such as particles and debris on the positioning structure, which may damage the cladding layer of the optical fiber when the optical fiber to be fused is aligned or even rotated.

In the embodiment of the present application, specifically, the positioning structure includes a V-shaped groove 31 and a pressure foot 32, and the fiber fusion step includes: placing the part of coating layer 13 of the two optical fibers 10 to be fused in the V-shaped groove 31 of the fusion splicing machine, and allowing the pressure foot 32 of the fusion splicing machine to face the V-shaped groove 31 and abutting against the part of coating layer 13 of the optical fibers 10 to be fused, and performing discharge fusion splicing on the end faces of the cut optical fibers 10 to be fused. Such placement avoids direct contact between the V-shaped groove 31 (and the presser foot 32) and the cladding layer 12 of the optical fiber 10 to be fused, and prevents impurities such as particles and debris on the V-shaped groove 31 and the presser foot 32, which may damage the cladding layer 12 of the optical fiber when the optical fiber 10 to be fused is aligned or even rotated.

Referring to FIGS. 9a-9c, in the embodiment of the present application, the steps of sleeving a fusion point with a light-transmitting tube 41, filling the light-transmitting tube 41 with coating glue and then performing a vacuum treatment include: using coating glue to seal between the first end of the light-transmitting tube 41 and the coating layer 13; placing the light-transmitting tube 41 vertically, and filling the light-transmitting tube 41 with the coating glue from the second end of the light-transmitting tube 41; placing the optical fiber 10 to be fused with the light-transmitting tube 41 in a vacuum box and evacuating for 10 min~60 min.

It should be noted that the use of optical fiber coating machines is prone to the present of air holes, glue shortage, coating breakage or dust, black spots and air holes caused by unclean coating grooves, which are not easy to find, it will greatly affect the stability of the laser. In the optical fiber fusion splicing method provided in the embodiment of the present application, when performing optical fiber coating, on the one hand, a light-transmitting tube 41 is used to cover the fusion part, and the light-transmitting tube 41 can provide a certain mechanical strength support for the fusion part to avoid bending of the fusion part and protect the fusion part; on the other hand, the optical fiber coating glue 42 is poured into the light-transmitting tube 41 and then the tube is vacuumed, the coating effect is good. The optical fiber coating glue 42 is transparent and has no defects, and the temperature rise is low during the working process.

In the embodiment of the present application, in the step of fusion point coating, the light-transmitting tube 41 is configured as a glass capillary.

It should be noted that the light-transmitting tube 41 is placed vertically, the first end of the light-transmitting tube 41 is the bottom end of the light-transmitting tube 41, and the second end of the light-transmitting tube 41 is the upper end of the light-transmitting tube 41. The optical fiber coating glue is poured from the upper end of the light-transmitting tube 41 until it is completely filled.

In the embodiment of the present application, the coating glue 42 is an ultraviolet coating glue, and the coating glue uses a low-refractive-index ultraviolet glue with a refractive index lower than 1.40.

In the embodiment of the present application, optionally, the power of the ultraviolet lamp is less than or equal to 1 W, and the irradiation time is between 30 s and 300 s. Since the high-power ultraviolet lamp irradiates the optical fiber coating glue in the light-transmitting tube 41, it will cause the optical fiber coating glue 42 to turn yellow, so a low-power ultraviolet lamp is used for irradiation.

Preferably, the power of the ultraviolet lamp is 10 mW, and the irradiation time is 40 s.

Specific Embodiments of the Present Application

The laser of this embodiment includes a high reflection grating fiber and a gain fiber. The output power of the laser is 1500 w and the wavelength is 1080 nm. The fiber core 11 of the high reflection grating fiber has a diameter of 20 µm, the cladding layer 12 has a diameter of 400 µm, and the coating layer 13 has a diameter of 550 µm; the fiber core 11 of the gain fiber has a diameter of 20 µm, the cladding layer 12 has a diameter of 400 µm, and the coating layer 13 has a diameter of 550 µm. The optical fiber fusion splicing method comprises the following steps:

Coating Layer Stripping:
(1) Cutting to form a slit 14: The preset stripping length of the high reflection grating fiber and the gain fiber is 4 cm, the diameter of the clamp opening of the Miller clamp is adjusted to 500 µm, so as to perform the cutting vertically at the preset stripping length of the high reflection grating fiber and the gain fiber to form the slit 14. The slit 14 is a circular arc slit 15, the number of the circular arc slits 15 is 4, and the 4 circular arc slits 15 are arranged at intervals on the same cut surface side;
(2) Soaking and softening treatment: Add 5 cm of anhydrous ethanol to a glass cup, cover it with a cover plate, pass the high reflection grating fiber and the gain fiber after the slit 14 through the opening of the cover plate, so that the slit 14 is just flush with the upper surface of the anhydrous ethanol, and the high reflection grating fiber and the gain fiber with the slit 14 are fixed to the cover plate and then taken out after soaking for 8 hours;
(3) Stripping the coating layer 13: Apply an axial force to the soaked high reflection grating fiber and the soaked gain fiber to remove the coating layer 13 of the high reflection grating fiber and the gain fiber.

Fiber cleaning: Use an ultrasonic cleaner to clean the high reflection grating fiber and the gain fiber after stripping the coating layer 13. The cleaning agent is anhydrous ethanol, the cleaning power is 3 W, and the cleaning time is 30 s.

Fiber drying: Use a clean compressed nitrogen tank to blow and dry the cleaned high reflection grating fiber and the soaked gain fiber to prevent anhydrous ethanol residue.

Fiber cutting: The first clamp 21 is used to clamp one end of the high reflection grating fiber from which the coating layer 13 has been stripped, and the second clamp 22 is used to clamp the part of the high reflection grating fiber with the coating layer 13; the high reflection grating fiber with the coating layer 13 stripped between the first clamp 21 and the second clamp 22 is cut to form a crack; the first clamp 21 and the second clamp 22 are used to respectively apply axial tension in opposite directions to the high reflection grating fiber to disconnect the high reflection grating fiber;

The first clamp 21 is used to clamp one end of the gain fiber from which the coating layer 13 has been stripped, and the second clamp 22 is used to clamp the part of the gain fiber with the coating layer 13; the gain fiber with the coating layer 13 stripped between the first clamp 21 and the second clamp 22 is cut to form a crack; the first clamp 21 and the second clamp 22 are used to respectively apply axial tension in opposite directions to the gain fiber to disconnect the gain fiber;

Wherein, the tension is 1000 psi and the cutting length is 4 mm.

Fiber fusion: Place the part of coating layer 13 of the high reflection grating fiber in the V-shaped groove 31 of the fusion splicing machine, and allow the pressure foot 32 of the fusion splicing machine to face the V-shaped groove 31 and abut against the part of coating layer 13 of the high reflection grating fiber; Place the part of coating layer 13 of the gain fiber in the V-shaped groove 31 of the fusion splicing machine, and allow the pressure foot 32 of the fusion splicing machine to face the V-shaped groove 31 and abut against the coating layer 13 of the gain fiber; Align the end faces of the cladding layers 12 of the high reflection fiber grating and the gain fiber, and perform discharge fusion splicing, wherein the discharge duration is 10000 ms.

Fiber coating: Use dust-free paper dipped in alcohol to wipe the coating layer of the optical fiber after fusion, and then sleeve the fusion part with a light-transmitting tube 41, wherein the glass tube has an inner diameter of 0.8 mm, an outer diameter of 1.5 mm, and a length of 15 mm. A part of coating layer 13 of the high reflection grating fiber and a part of coating layer 13 of the gain fiber are located in the light-transmitting tube 41, the light-transmitting tube 41 is placed vertically, the bottom end of the light-transmitting tube 41 and the coating layer 13 are sealed with ultraviolet glue, and the coating glue is poured into the light-transmitting tube 41 from the top of the light-transmitting tube 41; the light-transmitting tube 41 is placed in a vacuum box and evacuated for 30 minutes; the light-transmitting tube 41 is irradiated with an ultraviolet lamp to solidify the coating glue in the light-transmitting tube 41, wherein the refractive index of the coating glue is 1.373.

In the specific embodiment of the present application, the gain fiber is coiled into the groove of the high reflection grating fiber, and the groove size of the fusion point area matches the size of the glass tube; then the coating glue is poured into the fusion part of the two. When the measured laser output is 1500 W, there is no obvious bright spot at the fusion part, the heat is uniform, and the fusion point is only 40° C., which is far below the threshold of 80° C.; if the coating machine is used for coating, the temperature will be between 50° C. and 60° C. due to the whitening of the coating surface. The fusion point temperature is significantly reduced by the method of pouring the coating glue.

The scope of application of this application includes but is not limited to the high-power continuous 1080 nm laser mentioned in the specific embodiment of this application, but it is also applicable to the treatment method for fusion part in the continuous, quasi-continuous or pulsed laser of other wavelengths.

Although the disclosure of this application is described as above, this application is not limited to this. Any person skilled in the art can make various changes and modifications without departing from the spirit and scope of this application. Therefore, the scope of protection of this application shall be based on the scope defined by the claims.

INDUSTRIAL APPLICABILITY

In the optical fiber fusion splicing method provided in the present application, when stripping the coating layer, an axial force is applied to the optical fiber after physical slitting and chemical immersion softening, to strip the coating layer and expose the cladding layer. Compared with the physical contact stripping in the prior art, the coating layer in the present application is softened after immersion and disconnected at the slit position, and there is no damage to the cladding layer caused by friction of hard debris, and the optical fiber stripping end is flat and smooth; when coating the fusion point, on the one hand, a light-transmitting tube is used to sleeve/cover the fusion part, and the light-transmitting tube can provide a certain mechanical strength support for the fusion part, avoid bending of the fusion part, and protect the fusion part; on the other hand, the coating glue is poured into the light-transmitting tube and then the tube is vacuumed, the coating effect is good, the coating glue is transparent and has no defects, and the temperature rise is low during the working process, thereby improving the quality of optical fiber splicing and ensuring smooth communication.

What is claimed is:

1. A method for optical fiber fusion splicing, wherein an optical fiber (10) to be fused comprises a fiber core (11), a cladding layer (12) and a coating layer (13) in order from the inside to the outside in a radial direction, the diameter of the cladding layer (12) is $D_1$, the diameter of the coating layer (13) is $D_2$, and the method comprises the following steps:
   coating layer stripping: cutting the coating layer at a preset stripping length of the optical fiber (10) to be fused, to form a slit (14) with a depth t between (0, $(D_2-D_1)/2$); immersing the optical fiber (10) to be fused in a softening liquid to soften the coating layer (13) after the slit (14) is formed, wherein the slit (14) is flush with the highest level of the softening liquid; after immersing for a predetermined time, taking out the optical fiber (10) to be fused and applying an acting force in an axial direction of the optical fiber (10) to be fused, to strip the softened coating layer (13) to expose the cladding layer (12);
   fiber cutting: cutting an end of the optical fiber (10) to be fused after stripping the coating layer (13) to obtain a fusion end face;
   fiber fusion: fusing two fusion end faces obtained in sequence through the coating layer stripping and fiber cutting steps; and
   fusion point coating: sleeving a fusion point with a light-transmitting tube (41), filling the light-transmitting tube (41) with coating glue and then implementing a vacuum process to the light-transmitting tube, and irradiating the light-transmitting tube (41) with an ultraviolet lamp to solidify the coating glue in the light-transmitting tube (41).

2. The method according to claim 1, wherein after the coating layer stripping step, the method further comprises:
   fiber cleaning: cleaning and drying the optical fiber (10) to be fused after stripping the coating layer (13).

3. The method according to claim 1, wherein in the step of "cutting the coating layer at a preset stripping length of the optical fiber (10) to be fused, to form a slit (14)", the slit (14) is a circular ring slit (16) or an arc slit (15).

4. The method according to claim 1, wherein in the step of "cutting the coating layer at a preset stripping length of the optical fiber (10) to be fused, to form a slit (14)", the number of the slits (14) is at least 2, and the slits (14) are arranged at intervals at the same cut surface side of the optical fiber (10) to be fused.

5. The method according to claim 1, wherein in the step of "immersing the optical fiber (10) to be fused in a softening liquid to soften the coating layer (13) after the slit (14) is formed", the softening liquid is anhydrous ethanol, the concentration of the anhydrous ethanol is greater than or equal to 99.5%, and the immersion time is greater than or equal to 6 hours; and/or wherein the softening liquid is contained in a container with a cover plate, the cover plate of the container is provided with an opening, and the end of the optical fiber (10) to be fused that has been slit passes through the opening and is immersed in the softening liquid.

6. The method according to claim 1, wherein the fiber cutting step comprises: using a first clamp (21) to clamp the end of the optical fiber (10) to be fused from which the coating layer (13) has been stripped; using a second clamp (22) to clamp a portion of the optical fiber (10) to be fused with the coating layer (13); cutting the optical fiber (10) to be fused, from which the coating layer (13) has been stripped, between the first clamp (21) and the second clamp (22), to form a crack; using the first clamp (21) and the second clamp (22) respectively to apply axial tension in opposite directions to the optical fiber (10) to be fused, so that the optical fiber (10) to be fused is disconnected.

7. The method according to claim 1, wherein the fiber fusion step comprises: fixing two optical fibers (10) to be fused on positioning structures of a fusion splicing device, aligning the fusion end faces of the two optical fibers (10) to be fused, and then performing discharge fusion splicing, wherein the positioning structures of the fusion splicing device act on the parts of the two optical fibers (10) to be fused that have the coating layer (13).

8. The method according to claim 1, wherein the step of "sleeving a fusion point with a light-transmitting tube (41), filling the light-transmitting tube (41) with coating glue and then implementing a vacuum process to the light-transmitting tube" comprises: using the coating glue to seal between a first end of the light-transmitting tube (41) and the coating layer (13); placing the light-transmitting tube (41) vertically, and filling the light-transmitting tube (41) with the coating glue from a second end of the light-transmitting tube (41); placing the optical fiber (10) to be fused sleeved with the light-transmitting tube (41) in a vacuum box and evacuating for 10 min to 60 min.

9. The method according to claim 8, wherein in the step of fusion point coating, the light-transmitting tube (41) is configured as a glass capillary.

10. The method according to claim 8, wherein in the step of fusion point coating, a low-refractive-index ultraviolet glue with a refractive index lower than 1.40 is used as the coating glue.

11. The method according to claim 8, wherein in the step of fusion point coating, the power of the ultraviolet lamp is less than or equal to 1 W and the irradiation time of the ultraviolet lamp is configured to be 30 s~300 s.

* * * * *